(12) United States Patent
Shahinpoor

(10) Patent No.: US 6,837,620 B2
(45) Date of Patent: Jan. 4, 2005

(54) SHAPE MEMORY ALLOY TEMPERATURE SENSOR

(76) Inventor: Mohsen Shahinpoor, 9910 Tamoan Dr., NE., Albuquerque, NM (US) 87111

( * ) Notice: Subject to any disclaimer, the term of this patent is extended or adjusted under 35 U.S.C. 154(b) by 0 days.

(21) Appl. No.: 10/464,244

(22) Filed: Jun. 18, 2003

(65) Prior Publication Data

US 2004/0120384 A1 Jun. 24, 2004

Related U.S. Application Data

(63) Continuation-in-part of application No. 10/005,403, filed on Dec. 5, 2001, now Pat. No. 6,612,739.

(51) Int. Cl.[7] ................................................ G01K 5/00
(52) U.S. Cl. ...................... 374/205; 374/195; 374/187; 374/194
(58) Field of Search ................................ 374/205, 187, 374/194, 195, 198, 199, 200, 190, 159; 116/221

(56) References Cited

U.S. PATENT DOCUMENTS

| | | | | |
|---|---|---|---|---|
| 3,291,617 A | * | 12/1966 | Barker et al. ............... | 116/221 |
| 3,594,675 A | * | 7/1971 | Willson ..................... | 337/140 |
| 5,076,197 A | * | 12/1991 | Darringer et al. .......... | 116/221 |
| 5,335,994 A | * | 8/1994 | Weynant nee Girones .. | 374/205 |
| 5,366,292 A | * | 11/1994 | Voss ........................... | 374/188 |
| 5,531,180 A | * | 7/1996 | Bianchini ................... | 116/216 |
| 5,735,607 A | * | 4/1998 | Shahinpoor et al. ........ | 374/187 |
| 6,158,381 A | * | 12/2000 | Bray .......................... | 116/216 |
| 6,422,171 B1 | * | 7/2002 | Betts .......................... | 116/221 |
| 6,425,343 B1 | * | 7/2002 | Akers et al. ................ | 116/216 |
| 2003/0188676 A1 | * | 10/2003 | Petrakis ...................... | 116/216 |

FOREIGN PATENT DOCUMENTS

| | | | | | |
|---|---|---|---|---|---|
| JP | 56166437 A | * | 12/1981 | ............ | G01K/1/14 |
| JP | 63241325 A | * | 10/1988 | ............ | G01K/11/00 |
| JP | 02134523 A | * | 5/1990 | ............ | G01K/11/00 |
| JP | 03135742 A | * | 6/1991 | ............ | G01K/11/00 |
| JP | 10019685 A | * | 1/1998 | ............ | G01K/5/60 |
| JP | 10062267 A | * | 3/1998 | ............ | G01K/11/00 |

* cited by examiner

Primary Examiner—G. Bradley Bennett
Assistant Examiner—Mirellys Jagan
(74) Attorney, Agent, or Firm—V. Gerald Grafe

(57) ABSTRACT

A sensor provides a persistent indication that it has been exposed to temperatures below a certain critical temperature for a predetermined time period. An element of the sensor made from shape memory alloy changes shape when exposed, even temporarily, to temperatures below the Austenitic start temperature $A_s$ and well into Martensite finish temperature $M_f$ off the shape memory alloy. The shape change of the SMA element causes the sensor to change between two readily distinguishable states. The sensor includes a one-way stop element that creates a persistent indication of the temperature history, allowing the sensor to be manufactured and stored at temperatures above the Austenitic temperature without causing the indication of an over-temperature event.

20 Claims, 13 Drawing Sheets

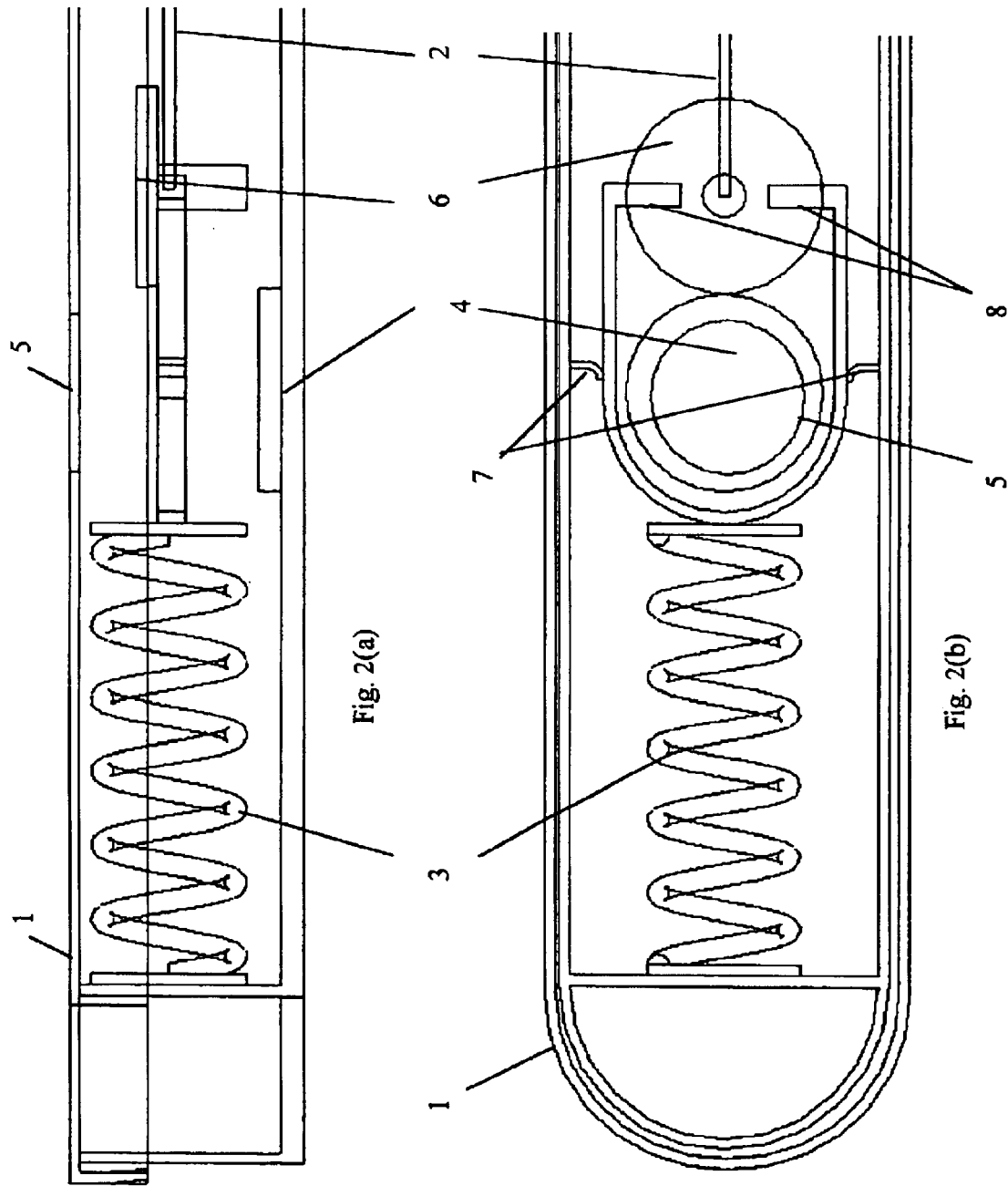

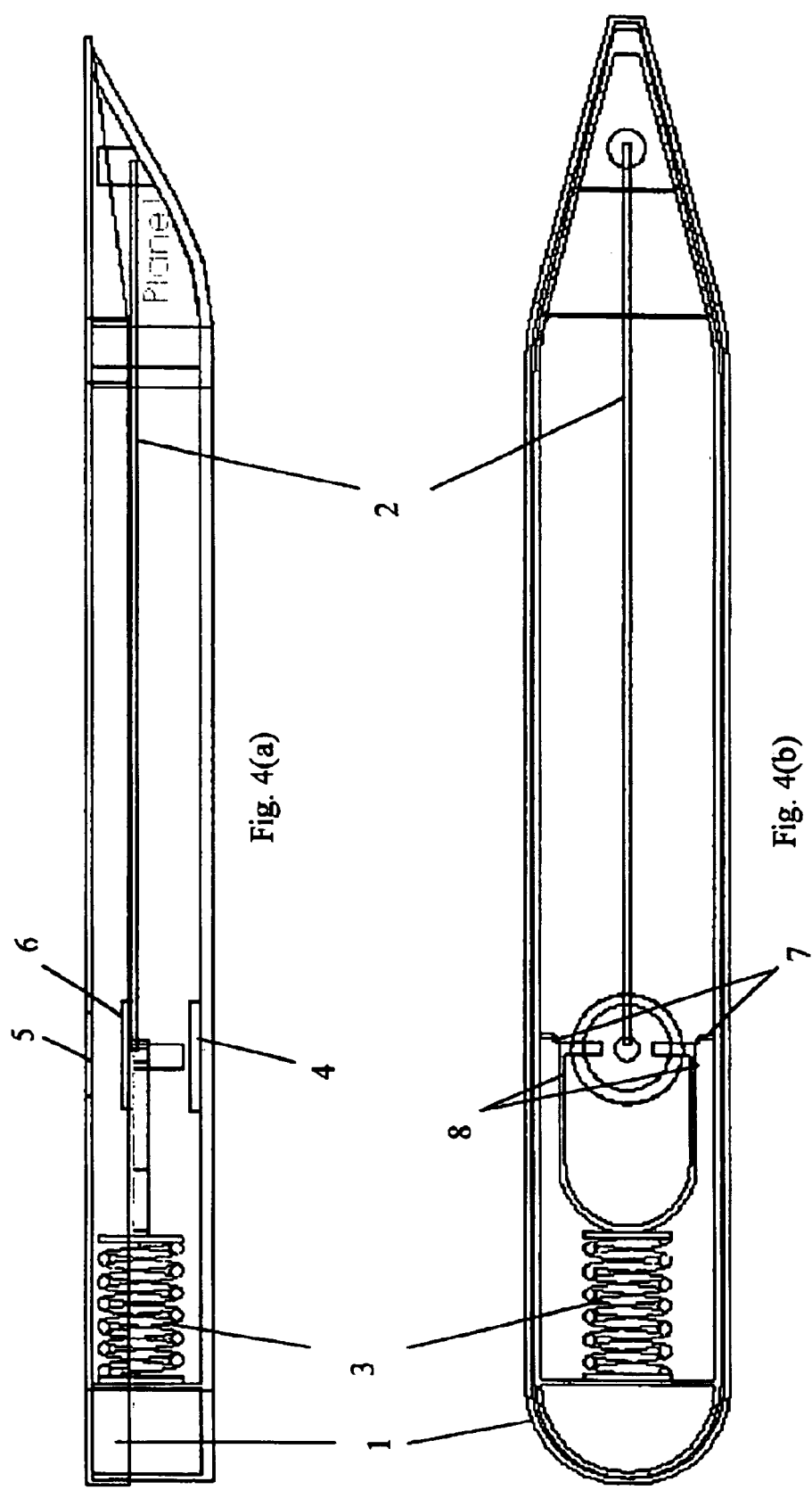

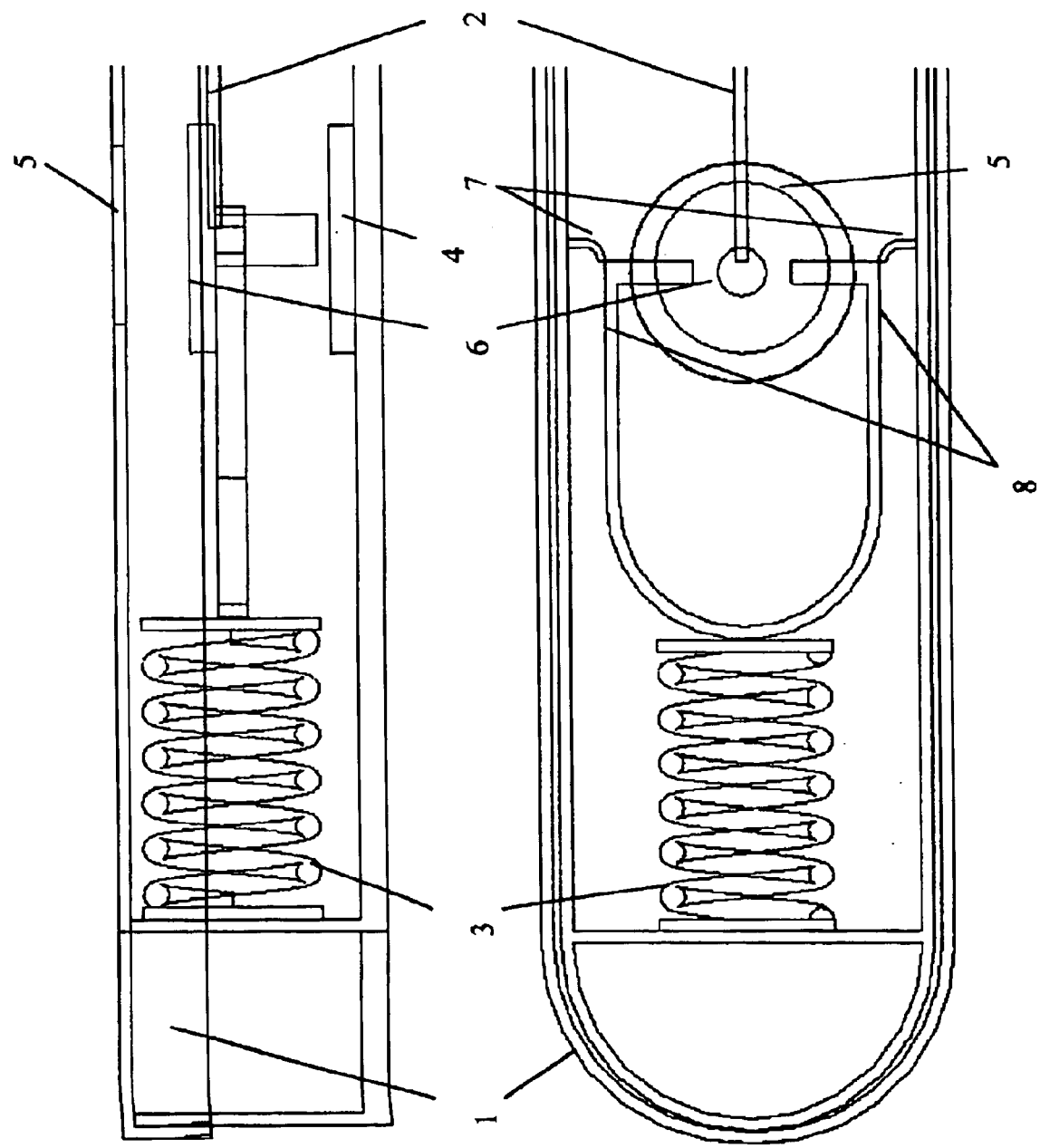

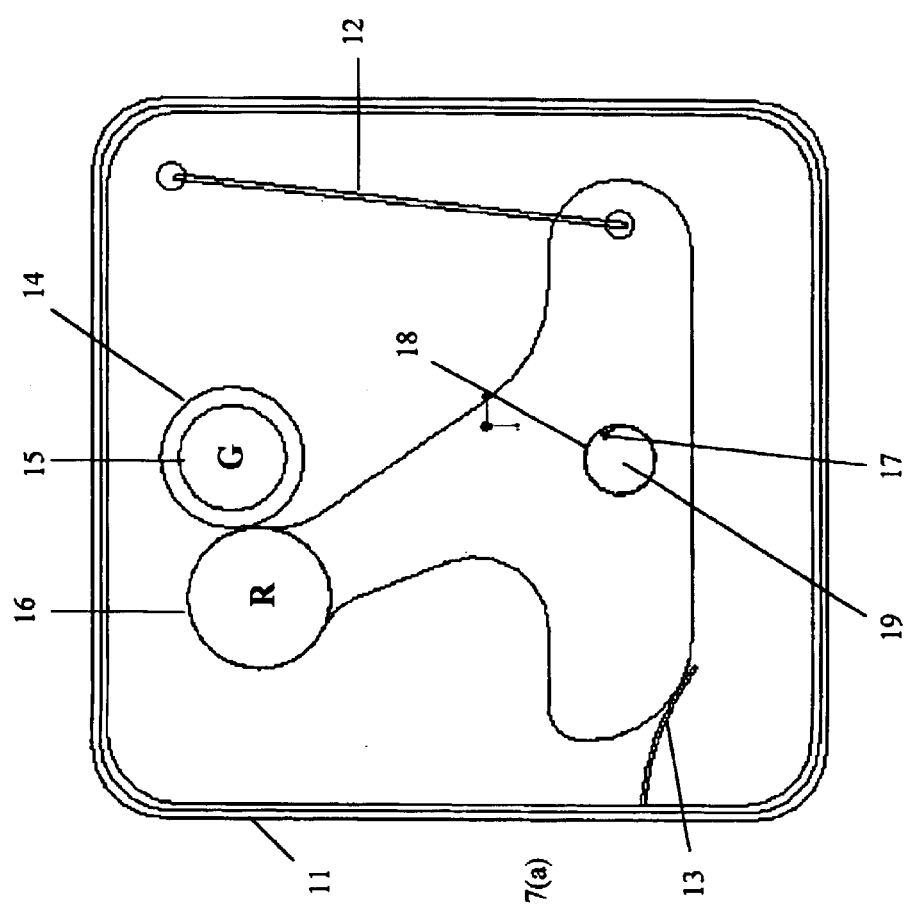

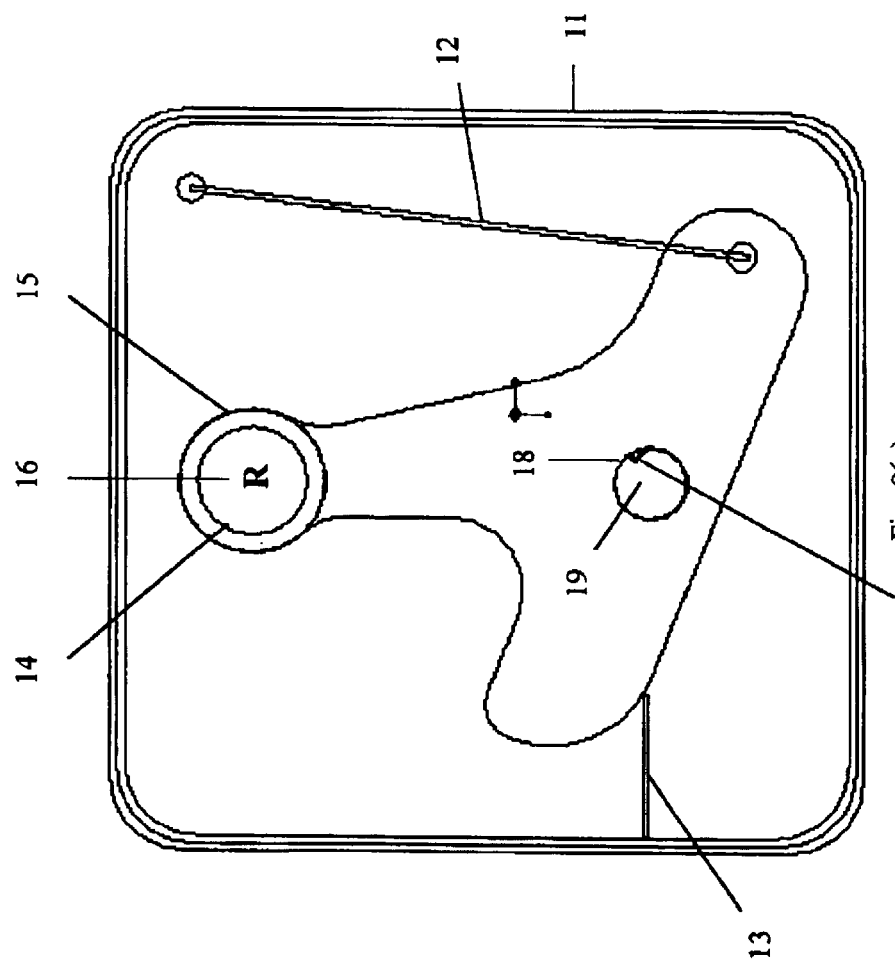
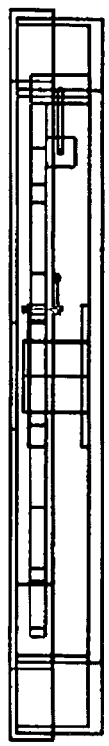

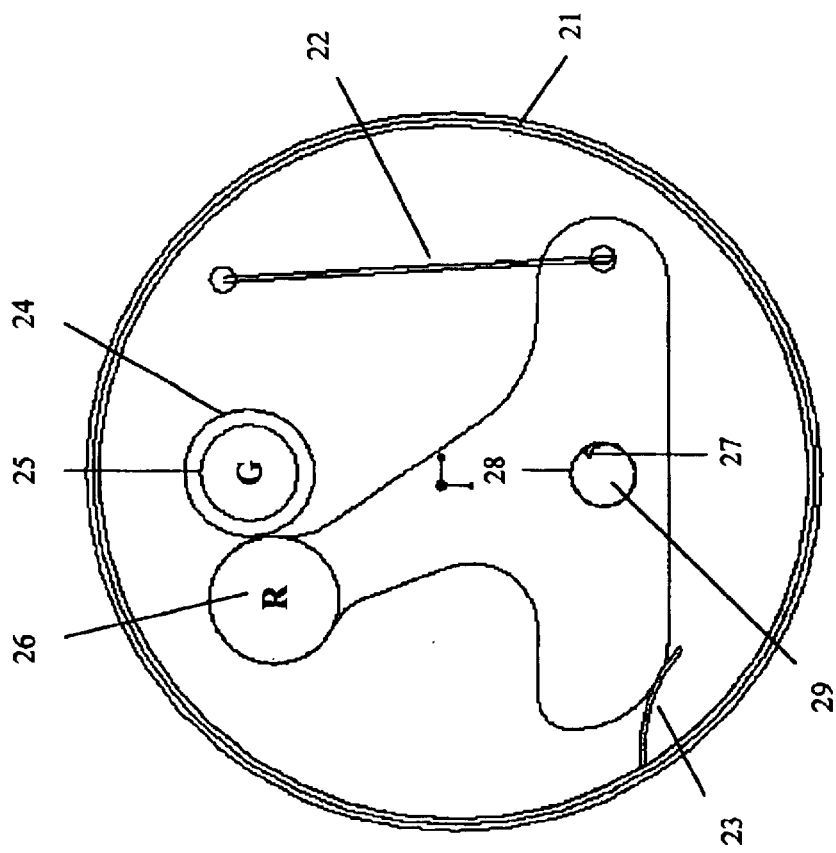
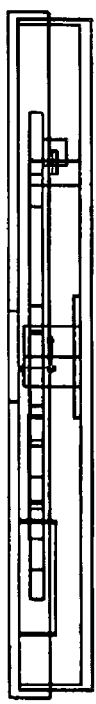
Fig. 10(a)
Fig. 10(b)
Fig. 10(c)

SHAPE MEMORY ALLOY TEMPERATURE SENSOR

CROSS REFERENCE TO RELATED APPLICATIONS

This invention claims priority under 35 U.S.C. 120 as a continuation-in-part of U.S. patent application Ser. No. 10/005,403, now U.S. Pat. No. 6,612,739 filed Dec. 5, 2001, titled "Shape Memory Alloy Temperature Sensor," incorporated herein by reference.

BACKGROUND OF THE INVENTION

This invention relates to temperature sensors, specifically shape memory alloy temperature sensors that provide persistent indication once their temperature reaches, exceeds or goes below a critical value.

Exposure to temperatures above or below a critical temperature can damage many important materials. Food products such as frozen dairy products and frozen meats can spoil when exposed to thawing temperatures for even a short time. Products that need to be kept cool but unfrozen, such as pharmaceutical drugs, vaccines, and serums can spoil if frozen temporarily and then warmed up to normal but cool temperatures. Frozen medical products such as blood and certain pharmaceuticals can be unsafe once exposed to thawing or other high temperatures, even if the temperature later returns to a safe value. Low temperatures can also compromise important properties of some rubber and rubber-like materials. The damage is often unseen, and can persist even if the temperature returns to an acceptable level. This situation can arise in transportation, where a frozen product temporarily experiences high temperatures due to improper handling or cooling equipment malfunction or a cooled product temporarily experiences a freezing temperature due to improper handling or cooling equipment malfunction.

Many conventional temperature sensors do not provide a persistent record of temporary temperature deviations. Conventional temperature sensors, such as common thermometers, indicate the current temperature only. They provide a continuous indication of the current temperature of the material. They do not provide a permanent indication of out-of-range temperatures without additional permanent recording apparatus. Accordingly, there is a need for sensors that provide a persistent record of temporary out-of-range temperatures.

Shape memory alloys (SMAs) have properties that can be useful in developing the needed sensors. An SMA can be trained to have a certain shape in its Austenitic state or at temperatures above the SMA's Austenitic finish temperature $A_f$. The SMA moves in a certain fashion to a second shape, its Martensitic state, which is a softer state for the material, when the temperature drops below the Austenitic finish temperature $A_f$ and eventually reaches below the Martensite start temperature $M_s$. The SMA will not return to the Martensite shape without additional external force even if the temperature subsequently falls below the Austenitic temperature $A_f$. SMAs are used in a variety of applications, such as those described in "Design and Modeling of a Novel Fibrous SMA Actuator," Proc. SPIE Smart Materials and Structures Conference, vol. 2190, pp. 730–738 (1994), and "A Phenomenological Description of Thermodynamical Behavior of Shape Memory Alloys," Transactions of the ASME, J. Appl. Mech., vol. 112, pp. 158–163 (1990). SMAs have been suggested for use in persistent temperature indicators. See Shahinpoor, U.S. Pat. No. 5,735,607, incorporated herein by reference. The sensors suggested by the U.S. Pat. No. 5,735,607, however, can require that the apparatus be kept below the threshold temperature during assembly and storage. This requirement can complicate manufacture and handling. There is a need for temperature indicators that can be manufactured, stored, and handled at arbitrary temperatures, then enabled to provide a persistent record of temporary temperature deviations.

SUMMARY OF THE INVENTION

The present invention can provide a freeze indicator or an indicator of lower critical temperatures reached from higher temperatures. The present invention comprises a sensing element mounted with a body. The sensing element comprises a portion made with a shape memory alloy stressed by a resilient body such as a spring or an elastic flap. The sensing element mounts with the body, fixedly at a first end. At the second end, the sensing element mounts with a forcing element, which in turn mounts with the body. The forcing element exerts a force on the sensing element tending to elongate the shape memory alloy element once the freezing temperature or the lower critical temperature is reached. The force exerted is more than that required to elongate the shape memory alloy element when it is in its softened Martensitic state at the lower critical temperature, but less than that required to elongate the shape memory alloy element when it is in its contracted state. The sensing element, in one embodiment, mounts with the body in a unidirectional restraining relationship, where the restraining relationship allows the sensing element to elongate responsive to the forcing element, but, once a sufficient motion has occurred, substantially prevents shortening of the sensing element by means of one-way stops or locking mechanisms.

In operation, the apparatus can be assembled at temperatures above the critical temperature of the shape memory alloy element, causing the sensing element to be at a length less than that required to engage the restraining relationship. As long as the apparatus does not experience temperatures below the critical temperature, the shape memory alloy element will overcome the forcing element and the sensing element will not engage the restraining element. If the temperature drops below the critical temperature, then the shape memory alloy element will soften, allowing the forcing element to move the sensing element into the restraining relationship. Subsequent temperature elevation above the critical temperature will not return the sensing element to the original configuration, since the restraining element now prevents contraction of the shape memory alloy element by means of one-way stops. By making the positioning of the sensing element within the restraining relationship perceptible, the apparatus provides a persistent indication of even transitory temperature excursions into the region where the shape memory alloy element is in its softened state.

The present invention also comprises a variety of body, shape memory alloy element, sensing element, forcing element, and restraining element configurations.

Advantages and novel features will become apparent to those skilled in the art upon examination of the following description or may be learned by practice of the invention. The objects and advantages of the invention may be realized and attained by means of the instrumentalities and combinations particularly pointed out in the appended claims.

DESCRIPTION OF THE FIGURES

The accompanying drawings, which are incorporated into and form part of the specification, illustrate embodiments of the invention and, together with the description, serve to explain the principles of the invention.

FIGS. 2(a,b) is an illustration of an apparatus according to the present invention.

FIGS. 4(a,b) is an illustration of an apparatus according to the present invention.

FIGS. 5(a,b) is an illustration of an apparatus according to the present invention.

FIGS. 7(a,b,c) is an illustration of an apparatus according to the present invention.

FIGS. 9(a,b,c) is an illustration of an apparatus according to the present invention.

FIGS. 10(a,b,c) is an illustration of an apparatus according to the present invention.

DETAILED DESCRIPTION OF THE INVENTION

The present invention comprises a sensing element mounted with a body. The sensing element comprises a portion made with a shape memory alloy. The sensing element mounts with the body, fixedly at a first end. At the second end, the sensing element mounts with a forcing element, which in turn mounts with the body. The sensing element exerts a force to resilient forcing element if the temperature is above the critical temperature. On the other hand the forcing element exerts a force on the sensing element tending to elongate the shape memory alloy element if the temperature is below or equal to the lower critical temperature (freezing temperature). The force exerted is more than that required to elongate the shape memory alloy element when it is in its softened Martensitic state, but less than that required to elongate the shape memory alloy element when it is in its contracted Austenitic state. The sensing element mounts with the body in either a unidirectional or rotatory restraining relationship, where the restraining relationship allows the sensing element to elongate responsive to the forcing element, but, once a sufficient motion has occurred, substantially prevents shortening of the sensing element by means of built in one-way no-return stops.

In operation, the apparatus can be assembled at temperatures above the critical temperature of the shape memory alloy element, causing the sensing element to be at a length less than that required to engage the restraining relationship. As long as the apparatus does not experience temperatures below the critical temperature, the shape memory alloy element will overcome the forcing element and the sensing element will not engage the restraining element. If the temperature drops below the critical temperature, then the shape memory alloy element will soften, allowing the forcing element to move the sensing element into the restraining relationship. Subsequent temperature elevation above the critical temperature will not return the sensing element to the original configuration, since the restraining element now prevents contraction of the shape memory alloy element. By making the positioning of the sensing element within the restraining relationship perceptible, the apparatus provides a persistent indication of even transitory temperature excursions into the region where the shape memory alloy element is in its softened state.

The present invention also comprises a variety of body, shape memory alloy element, sensing element, forcing element, and restraining element configurations.

EXAMPLE EMBODIMENT

FIGS. 1–6 are schematic illustrations of various states of an example embodiment of the present invention. The apparatus generally comprises a body 1, a sensing element 2 mounted with the body 1, and a forcing or resilient element 3 mounted with the body 1 and the sensing element 2. Additional elements, and their interaction to achieve the desired functionality, are described below.

Figure 1A:
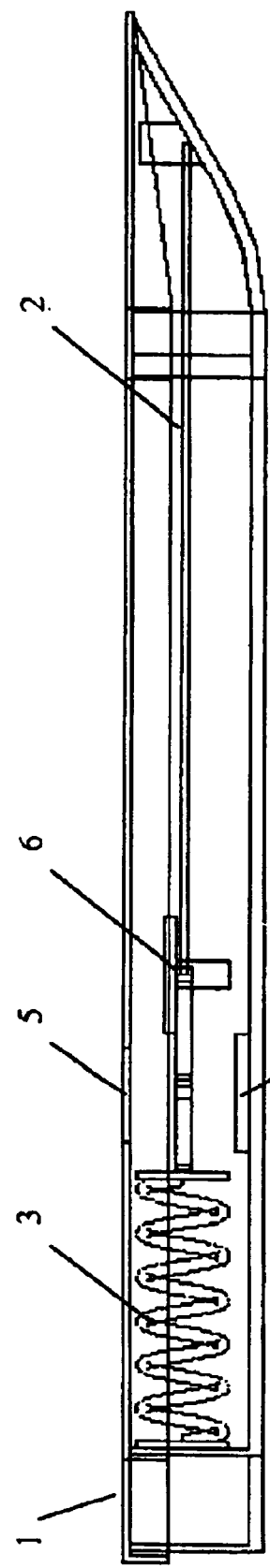
FIGS. 1(a,b) is an illustration of an apparatus according to the present invention.
Figure 1B:
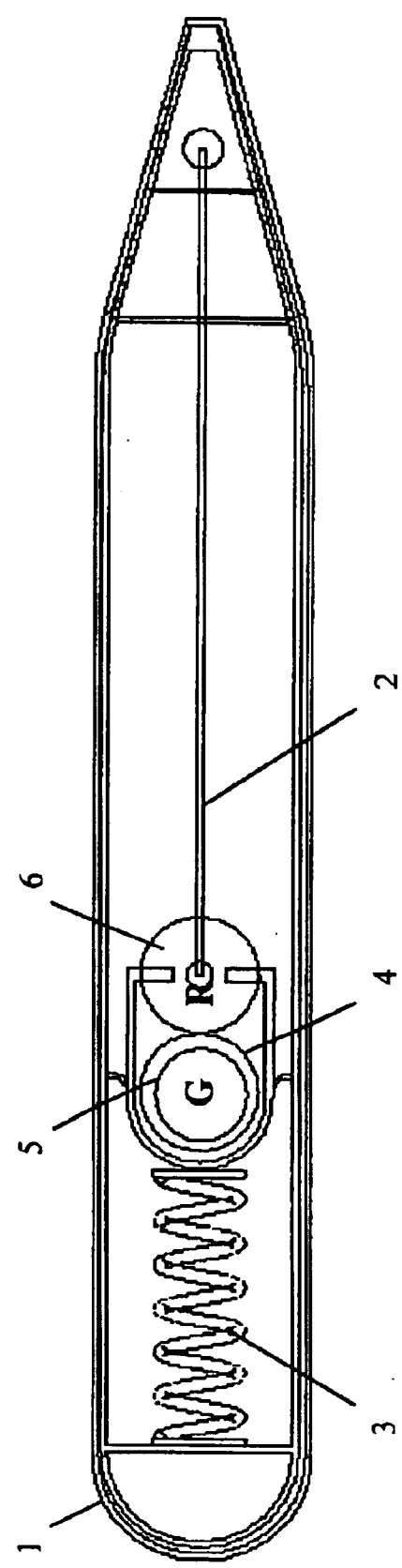

FIGS. 1(a) and 1(b) are the side view and the top view of a needle version of an apparatus according to the present invention suitable for persistent indication of low temperature events. Sensing element 2 is made at least in part with and SMA. In FIG. 1(a) the SMA wire 2 is its Austenitic contracted state and pulls the resilient element 3 (e.g., a spring) open and tensioned. A first indicator 4, for example a green circle, will be visible through a window 5 in the body 1, since an obscuring indicator 6 is pulled out of an obscuring relationship by the contracted SMA element 2.

FIGS. 2(a) and 2(b) are a close up side view and a top view of the example embodiment shown in FIGS. 1(a,b). The SMA element 2 is its Austenitic contracted state and pulls the resilient body 3 open and tensioned. A first indicator such as a green surface 4 will be visible through a window 5 in the body 1. Locking mechanism 7, mounted with the body 1, is configured such that it allows motion of the obscuring indicator 7 and an associated carrier 8.

Figures 3A, 3B:
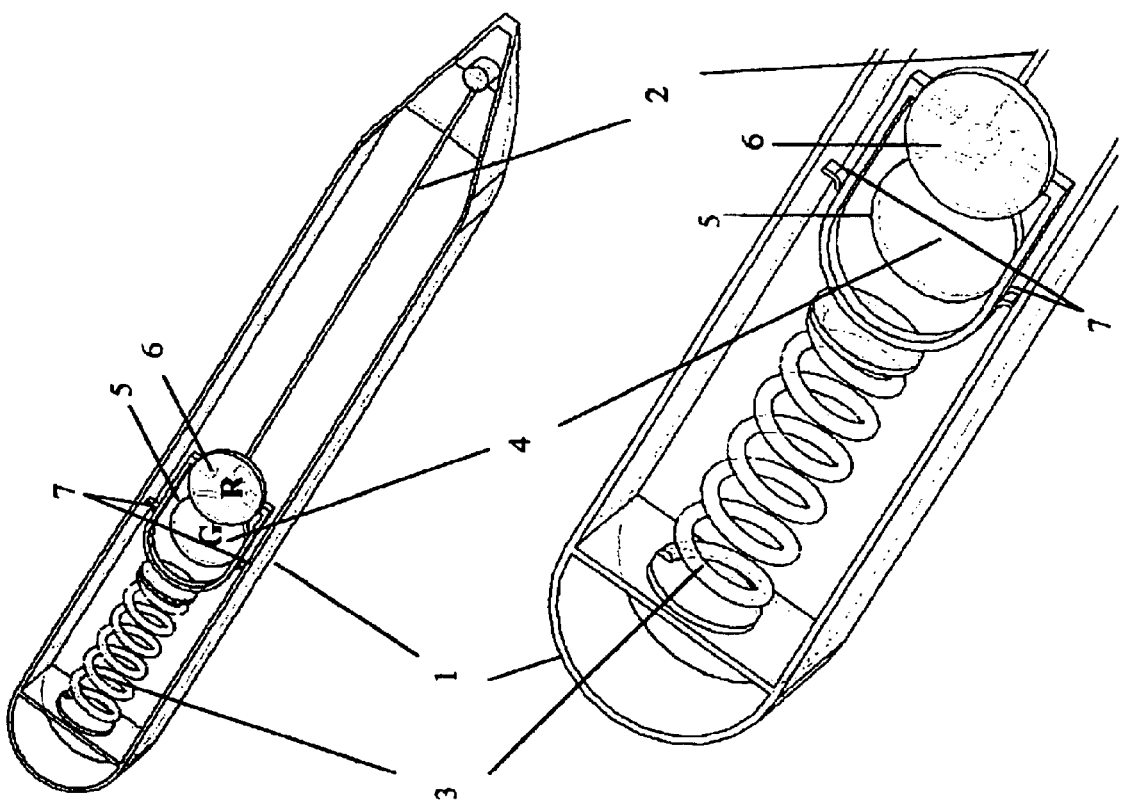
FIGS. 3(a,b) is an illustration of an apparatus according to the present invention.

FIGS. 3(a) and 3(b) are an isometric view and a close up isometric view of the example embodiment shown in FIGS. 1(a,b), with the apparatus at a temperature just below the Austenite finish temperature of the SMA wire 2. The SMA wire 2 begins to soften as it approaches its soft Martensitic state at lower temperature from its Austenitic contracted state. The resilient body 3 stretches the SMA wire 2 and pulls the obscuring indicator 6, e.g., a red circle, to a position where the obscuring indicator 6 partially covers the first indicator 4. The window 5 in the body will show part of each indicator 4,6.

Figures 6A, 6B:
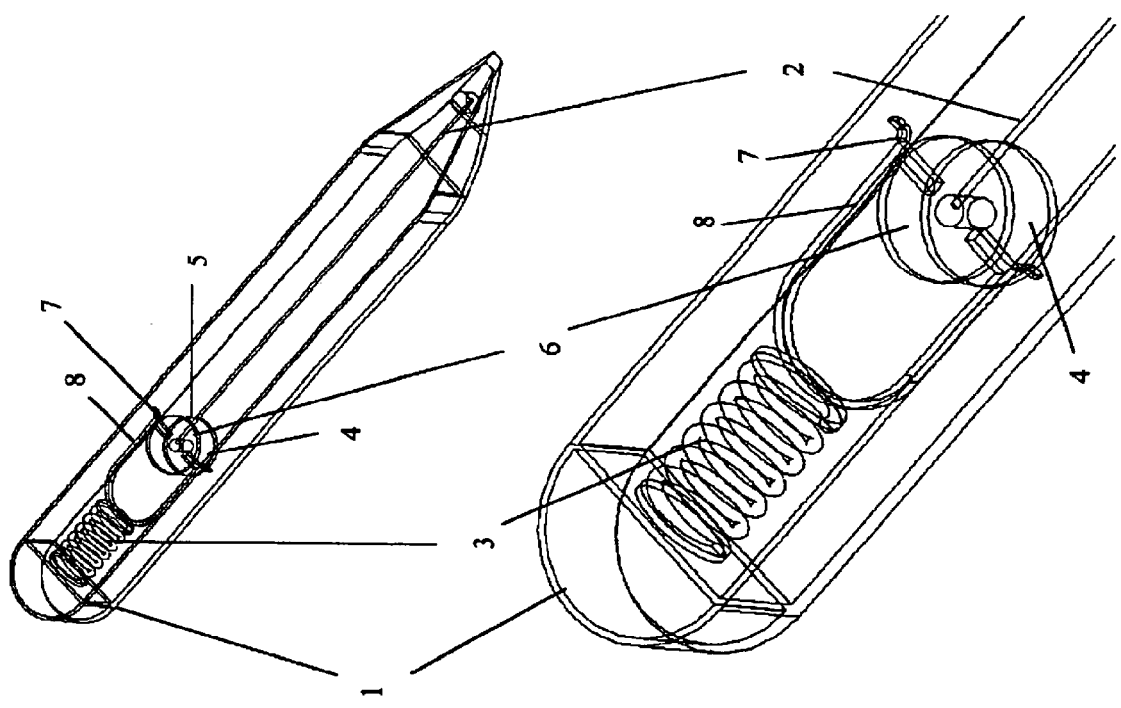
FIGS. 6(a,b) is an illustration of an apparatus according to the present invention.

FIGS. 4(a) and 4(b) are a side view and a top view of the example embodiment shown in FIGS. 1(a,b), with the apparatus at a temperature below the critical lower or freezing temperature at which the SMA wire is in its soft Martensite state. FIGS. 5(a) and 5(b) are a close up side view and a top view of the apparatus in the same temperature condition. FIGS. 6(a) and 6(b) are an isometric view and a close up isometric view of the apparatus in the same temperature condition. The SMA wire 2 softens as it reaches its soft Martensitic state at lower temperature from its Austenitic contracted state and the resilient body 3 stretches the SMA wire 2 and pulls the obscuring indicator 6 to completely cover the first indicator 4. The locking mechanism, comprising flaps 7, engage carrier 8 of the obscuring indicator 6, preventing it from moving to reveal the first indicator 4 even if the temperature goes back up to normal from the lower critical or freezing temperature. The indicator will consequently show, for example, a persistent red circle through the indicator window 5 if the apparatus ever experiences a temperature below the critical temperature, even if the temperature subsequently rises above the critical temperature. Various implementations of the restraining relationship are suitable for use with the present invention. For example, a pin can engage a slot or depression at the appropriate position. As another example, sawtooth or ratchet structures can allow motion in only a single direction. Other variations will be apparent to those skilled in the art.

EXAMPLE EMBODIMENT

Figure 8:
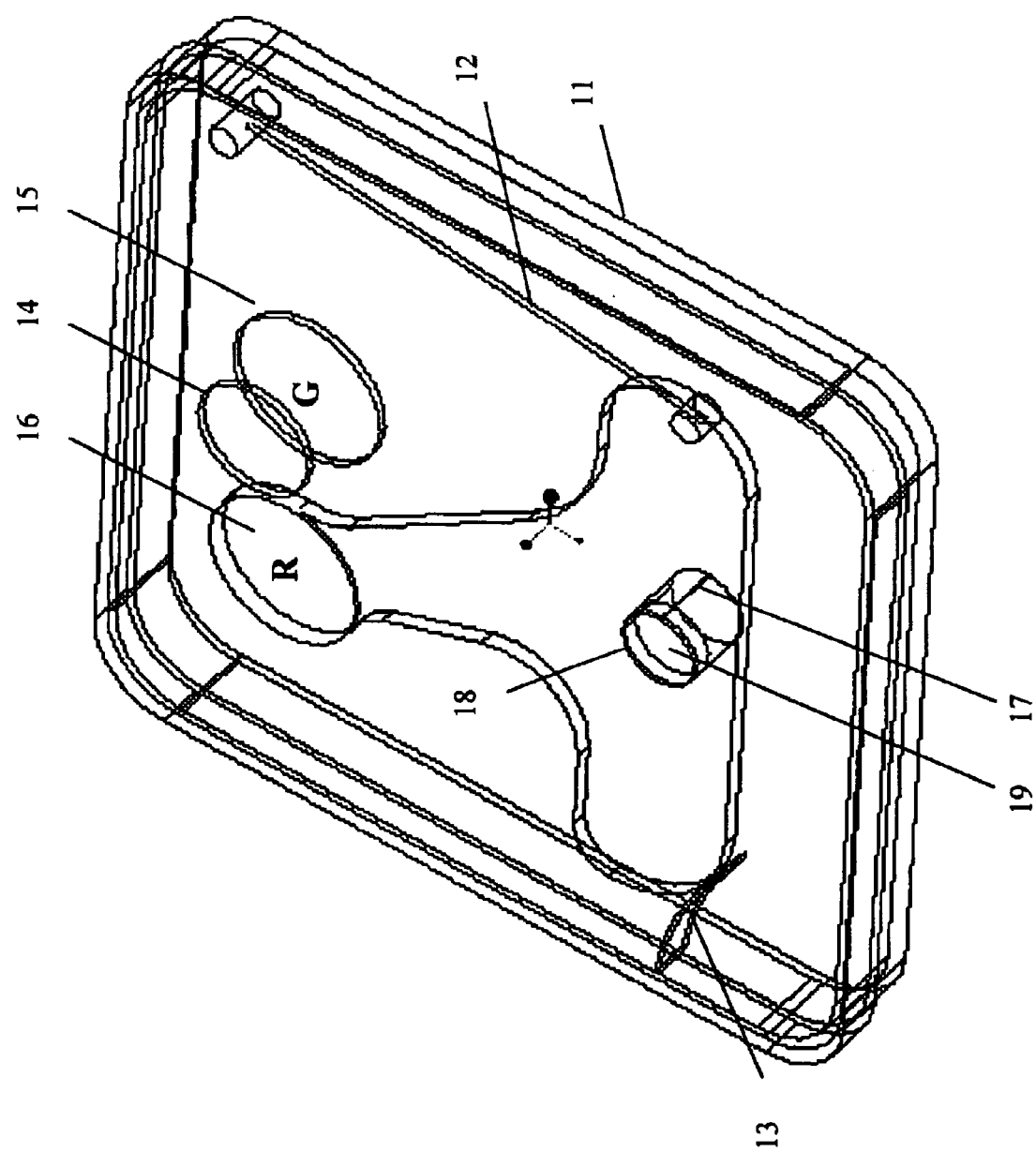
FIG. 8 is an illustration of an apparatus according to the present invention.

FIGS. 7–9 are schematic illustrations of an example embodiment of the present invention. The apparatus generally comprises a body 11, a sensing element 12 mounted with the body 11, and a forcing or resilient element 13 mounted with the body 11 and the sensing element 12. Additional elements, and their interaction to achieve the desired functionality, are described below.

FIGS. 7(a), 7(b) and 7(c) comprise a front view, top view, and side view of the flat square embodiment of an apparatus according to the present invention. Sensing element 12 comprises at least a portion made with an SMA wire. In the figure, the SMA wire 12 is its Austenitic contracted state and pulls the resilient body 13 open and tensioned. The apparatus accordingly will show a first indicator 14, for example a green circle 14, through an indicator window 15. The SMA wire prevents a second indicator 16, for example a red circle, from moving to where it would obscure the first indicator 15. The second indicator 16 mounts with an element that is pivotably mounted with the body 11. The pivotable mounting can comprise a pivoting plug 19, with a stepped keyway 18 that engages a no-return stop 17 to prevent the second indicator from returning to the position shown in the figure once it has moved to a position obscuring the first indicator 15 and also engaging the no-return stops 17.

FIG. 8 depicts an isometric version of the example embodiment shown in FIG. 7. The SMA wire 12 is its Austenitic contracted state and pulls the resilient body 13 open and tensioned. The figure shows a pivoting plug, no-return stops, and stepped keyway. The desired functionality can also be achieved with other restraining relationship mountings. For example, the second indicator 16 or corresponding element can be configured to engage the first indicator 14 or the window 15 by, as an example, fitting into a recess or over a protrusion thereon. Keys, plugs, latches, and bendable legs (as in the previous example embodiment) can also be used in various combinations to accomplish the desired restraining relationship when the second indicator moves to the appropriate position.

FIGS. 9(a), 9(b) and 9(c) are the front view, top view and the side view of the example embodiment of FIGS. 7–8, shown at a temperature below the critical lower or freezing temperature at which the SMA wire 12 is in its soft Martensite state. The SMA wire 12 softens as it reaches its soft Martensitic state at lower temperature from its Austenitic contracted state and the flap spring or the resilient body 13 stretches the SMA wire and rotates the second indicator 16 (e.g., red circle) to completely cover the first indicator 14 (e.g., green circle). The one-way no-return stops—flaps 17 on the pivoting plug 19 engages the edges 18 of the second indicator's associated element to prevent it from moving responsive to subsequent contraction of the SMA wire if the temperature goes back up to normal from the lower critical or freezing temperature. The apparatus can show a persistent red circle through its indicator window 15 indicating that the apparatus has experienced the lower critical temperature.

EXAMPLE EMBODIMENT

Figure 11:
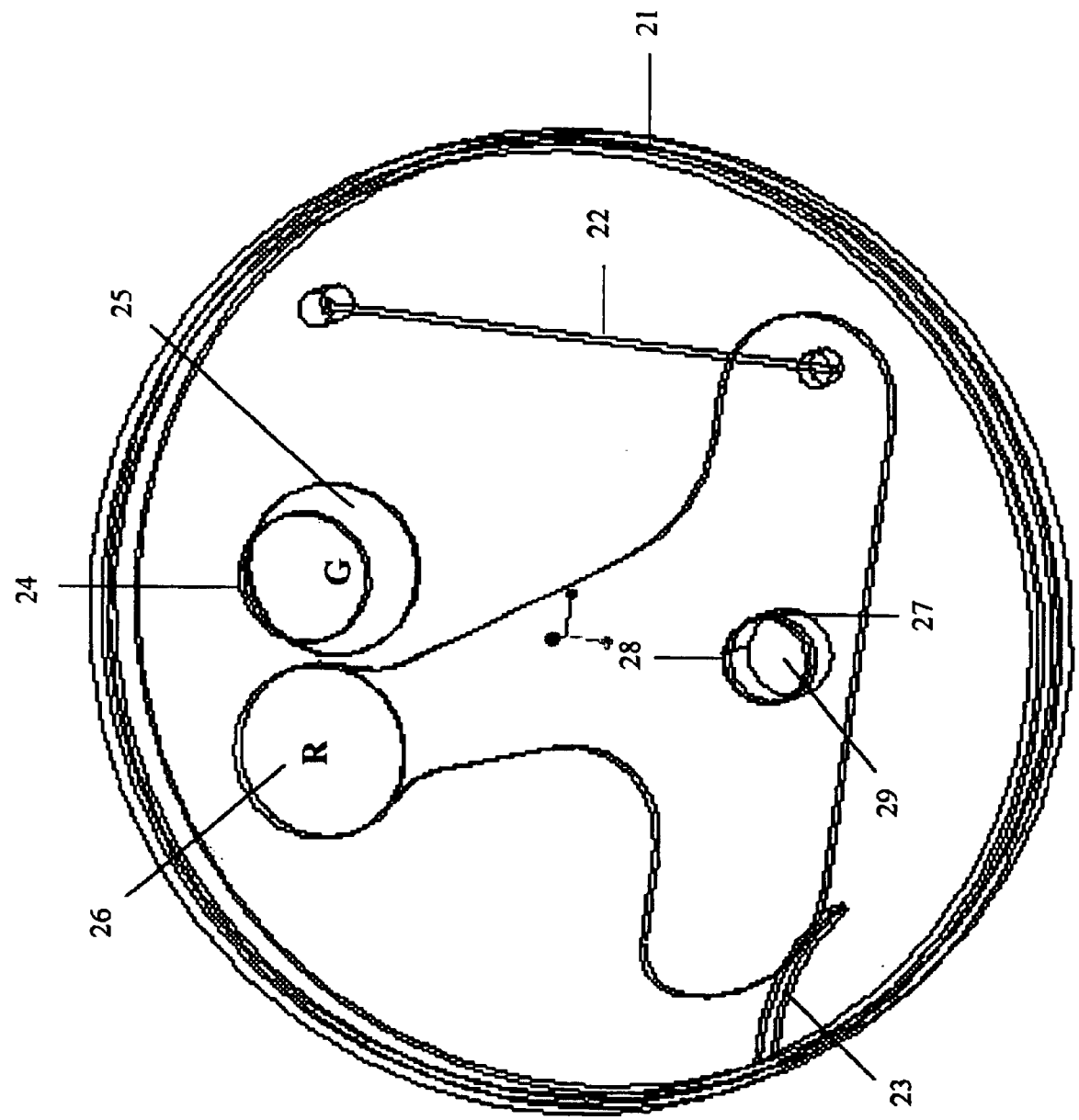
FIG. 11 is an illustration of an apparatus according to the present invention.
Figure 12:
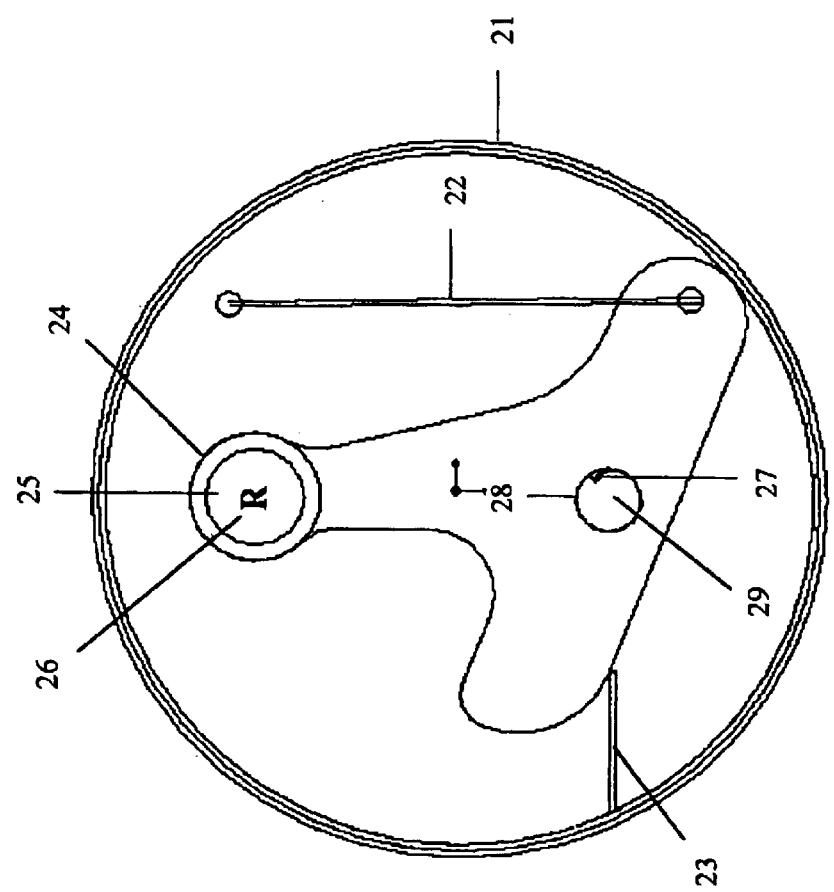
FIGS. 12(a,b,c) is an illustration of an apparatus according to the present invention.

FIGS. 10–12 are schematic illustrations of various states on an example embodiment of the present invention. The apparatus generally comprises a body 21, a sensing element 22 mounted with the body 21, and a forcing or resilient element 23 mounted with the body 21 and the sensing element 22. Additional elements, and their interaction to achieve the desired functionality, are described below.

FIGS. 10(a), 10(b) and 10(c) comprise a front view, top view, and side view of an example embodiment of the present invention at temperatures above the critical (freeze or lower) temperature. FIG. 11 depicts an isometric view of the same example embodiment. Sensing element 22 comprises an SMA wire 22. The SMA wire 22 is its Austenitic contracted state and rotates the resilient body or the spring 23 open and tensioned. Thus the apparatus will show a first indicator 24 (e.g., a green circle) through an indicator window 25 while a second indicator 26 (e.g., a red circle) is prevented by the contracted SMA wire 22 from obscuring the first indicator 24. The second indicator 26 mounts with the body 21 with a pivotable mounting comprising one-way no-return stops 27 on the pivoting plug 29 with a step keyway 28, similar to that discussed in the previous embodiment.

FIGS. 12(a), 12(b) and 12(c) are the front view, top view and the side view of the circular flat version of the freeze (or lower critical temperature) indicator 21 at temperatures below the critical lower or freezing temperature at which the SMA wire 22 is its soft Martensite state. Thus the SMA wire 22 softens as it reaches its soft Martensitic state at lower temperature from its Austenitic contracted state and the flap spring or the resilient body 23 stretches the SMA wire and rotate the red circle assembly 26 to completely cover the green circle assembly 24. The one-way no-return stops (flaps 27 on the pivoting plug 29 engages the edges 28 of the indicator to prevent it from contraction of the SMA wire if the temperature goes back up to normal from the lower critical or freezing temperature. Thus the indicator will show a persistent red circle through its indicator window 25 indicating that the package has experienced the lower critical temperature.

Figure 13:
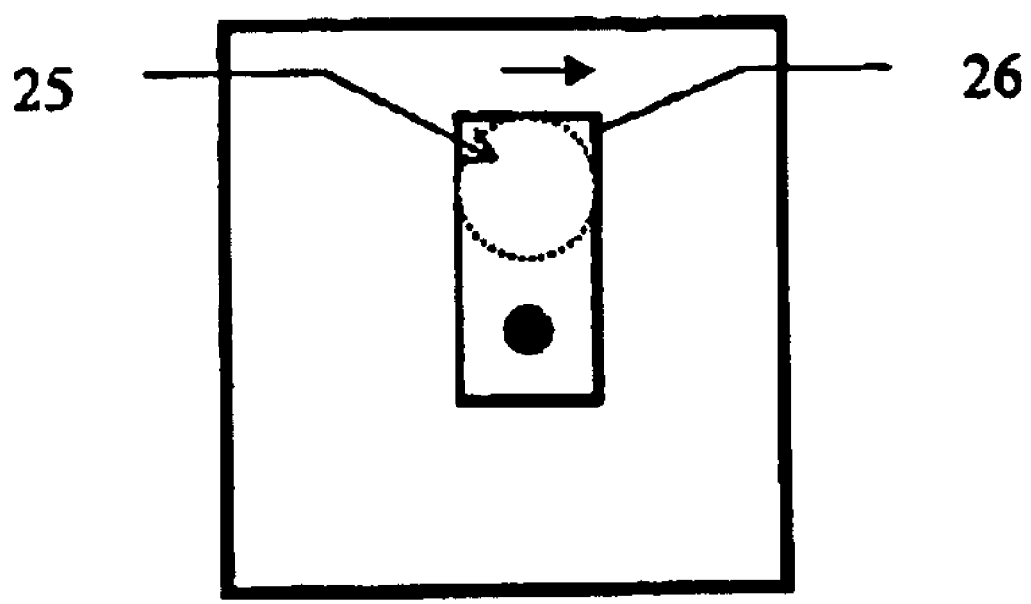
FIG. 13 is a schematic illustration of an alternative indicator arrangement.

In FIG. 13 the arrangement of the indicators has been changed. The moveable indicator 26 obscures the indicator 24 mounted with the body in the initial state. After the indicator rotates by action of the shape memory alloy element, then the moveable indicator 26 is moved such that it no longer obscures the indicator 24 mounted with the body.

Materials

The present invention can sense a wide range of temperatures when made with appropriate SMAs. Those skilled in the art know of many suitable SMAs, including Ag—Cd, Au—Cd, Cu—Al—Ni, Cu—Sn, In—Ti, Ni—Al, Ni—Ti, Fe—Mn—Si, Cu—Zn-A, Cu—Al—Ni, alloys thereof, and shape memory polymers such as polyurethanes. These materials typically possess Austenitic temperatures from −200° C. to 110° C. The addition of excess nickel, iron, chromium, and copper to the equiatomic alloy is common to adjust its physical properties (including its Austenitic finish temperature $A_f$). These materials exhibit a rather abrupt solid phase shape change, due to solid phase transformation between the Martensite and the Austenite state, when they experience temperatures above or below such transformation temperatures.

The particular sizes and equipment discussed above are cited merely to illustrate particular embodiments of the invention. It is contemplated that the use of the invention may involve components having different sizes and characteristics. It is intended that the scope of the invention be defined by the claims appended hereto.

I claim:

1. A temperature history indication apparatus, comprising:
   a) A body;
   b) A shape memory alloy element having a first length in a first state and a second length in a second state;
   c) Means for mounting the shape memory alloy element with the body such that, when the shape memory alloy element transitions from its first length to its second length, the means for mounting prevent the shape memory alloy element from attaining its first length even if the temperature of the shape memory alloy element would otherwise indicate a transition to the first length; and
   d) Means for making change in the length of the shape memory alloy element perceptible.

2. The apparatus of claim 1, wherein shape memory alloy is chosen from the group consisting of: Ag—Cd, Au—Cd, Cu—Al—Ni, Cu—Sn, In—Ti, Ni—Al, Ni—Ti, Fe—Mn—Si, Cu—Zn-A, Cu—Al—Ni, alloys thereof, shape memory polymers, polyester prepolymers, and polyurethane.

3. A temperature history indication apparatus, comprising:
   a) a body, defining a path having a length from an attachment portion thereof to a restraining portion thereof;
   b) a sensing element, mounted at a first end with the attachment portion fixed along the direction of the path, and extending along the direction of the path toward the restraining portion, wherein the sensing element comprises a shape memory alloy that, when in its softened state, provides the sensing element with a first length sufficient to extend from the attachment portion to the restraining portion, and, when in its contracted state, provides the sensing element with second length less than the initial length unless constrained by the restraining portion;
   c) wherein the restraining portion is adapted to, when the sensing element transitions from a length less than the first length to a length equal to the first length, prevent subsequent shortening of the sensing element without external mechanical intervention.

4. The apparatus of claim 3, wherein shape memory alloy is chosen from the group consisting of: Ag—Cd, Au—Cd, Cu—Al—Ni, Cu—Sn, In—Ti, Ni—Al, Ni—Ti, Fe—Mn—Si, Cu—Zn-A, Cu—Al—Ni, alloys thereof, shape memory polymers, polyester prepolymers, and polyurethane.

5. A apparatus for indicating a temperature event below a threshold temperature, comprising:
   a) A body;
   b) An indicator element mounted with the body, rotatable relative to the body about an axis;
   c) A forcing element mounted with the body and with the indicator element, disposed such that the forcing element urges rotation of the indicator element in a first direction;
   d) A shape memory alloy element mounted with the body and with the indicator element, disposed such that the shape memory alloy element is in its contracted state when exposed to temperature above the threshold temperature, and when in its contracted state opposes the action of the forcing element with sufficient force to prevent rotation of the indicator element, and such that the shape memory alloy element is in its softened state when exposed to temperatures below the threshold temperature, and when in its softened state does not prevent rotation of the indicator element responsive to the forcing element;
   e) Means for preventing the indicator element from rotating opposite the first direction once the indicator element has rotated a first amount in the first direction.

6. An apparatus as in claim 5), wherein the means for preventing comprise an engagement element that prevents rotation opposite the first direction when engaged, wherein the engagement element engages when the indicator element has rotated the first amount in the first direction.

7. An apparatus as in claim 5), wherein the body comprises a first indicator, and wherein the indicator element comprises a second indicator, and wherein the second indicator obscures the first indicator when the indicator element has rotated the first amount in the first direction.

8. An apparatus as in claim 5), wherein the body comprises a first indicator, and wherein the indicator element comprises a second indicator, and wherein the second indicator does not obscure the first indicator when the indicator element has rotated the first amount in the first direction.

9. The apparatus of claim 5, wherein shape memory alloy is chosen from the group consisting of: Ag—Cd, Au—Cd, Cu—Al—Ni, Cu—Sn, In—Ti, Ni—Al, Ni—Ti, Fe—Mn—Si, Cu—Zn-A, Cu—Al—Ni alloys thereof, shape memory polymers, polyester prepolymers, and polyurethane.

10. A temperature history indication apparatus, comprising
    a) A body;
    b) A forcing element mounted with the body;
    c) A sensing element comprising a shape memory alloy element having first and second ends, mounted fixedly with the body at the first end, and mounted with the body and the forcing element at the second end in a one-way restraining relationship, wherein the one-way restraining relationship substantially prevents motion of the second end toward the first end once the forcing element has moved the second end a sufficient distance from the first end, and where the forcing element does not supply sufficient force to move the second end the sufficient distance when the shape memory alloy element is in its contracted state; and
    d) further comprising a restrainable element mounted with the sensing element, and wherein the body defines a restraining portion adapted to allow motion of the restrainable element therethrough in one direction but not in the other direction once the second end has moved the sufficient distance away from the first end.

11. The apparatus of claim 10, wherein the shape memory alloy element is disposed within the body along a substantially linear path.

12. The apparatus of claim 10, wherein shape memory alloy is chosen from the group consisting of Ag—Cd, Au—Cd, Cu—Al—Ni, Cu—Sn, In—Ti, Ni—Al, Ni—Ti, Fe—Mn—Si, Cu—Zn-A, C Cu—Al—Ni, alloys thereof, shape memory polymers, polyester prepolymers, and polyurethane.

13. The apparatus of claim 10 wherein the sensing element comprises an indicator that assumes a first state when the second end has moved the sufficient distance, denoted condition a, and assumes a second state when the second end has not moved the sufficient distance, denoted condition b.

14. The apparatus of claim 13 wherein the body comprises a window, and wherein the indicator comprises a region of the sensing element whose appearance through the window when the apparatus is in condition a is distinguishable from its appearance through the window when the apparatus is in condition b.

15. The apparatus of claim 13, wherein the body comprises a signal region, and wherein the indicator obscures the signal region when the apparatus is in one of condition a and condition b, and does not obscure the signal region when the apparatus is in the other condition.

16. A temperature history indication apparatus, comprising:
  a) a body, defining a path from an attachment portion thereof to an engagement portion thereof;
  b) a sensing element having first and second portions, where the first portion mounts with the attachment portion such that motion of the first portion toward the engagement portion along the path is constrained, and having a temperature responsive element made of a shape memory alloy mounted with the first and second portions such that changes in the temperature responsive element urge motion of the second portion toward the attachment portion along the path;
  c) a forcing element, having first and second portions, where the first portion of the forcing element mounts with the second sensing element portion, and where the second portion of the forcing element mounts with the engagement portion of the body;
  d) a restraining element mounted with the body such that, when the second portion of the sensing element is in a first position the restraining element substantially prevents motion of the second portion toward the attachment portion;
  e) wherein the forcing element is adapted to apply a force to the second sensing element portion having a component of force substantially along the path, wherein the component along the path is sufficient to stretch the temperature responsive element such that the second portion of the sensing element attains the first position when the temperature responsive element is in its Austenitic state but insufficient to stretch the temperature responsive element such that the second portion of the sensing element attains the first position when the temperature responsive element is in its Martensitic state.

17. The apparatus of claim 16, wherein shape memory alloy is chosen from the group consisting of: Ag—Cd, Au—Cd, Cu—Al—Ni, Cu—Sn, In—Ti, Ni—Al, Ni—Ti, Fe—Mn—Si, Cu—Zn-A, Cu—Al—Ni, alloys thereof, shape memory polymers, polyester prepolymers, and polyurethane.

18. The apparatus of claim 16, wherein the body has a length greater than 5 cm and less than 15 cm, and wherein the body comprises a first section having a cross-sectional area of less than 27 mm$^2$ and a second section wherein temperature-responsive changes in the shape of the shape memory allow are observable.

19. The apparatus of claim 18, wherein the cross-sectional area of the first section changes with distance from the second section, and wherein the cross-sectional area of the first section is at a minimum at its greatest distance from the second section.

20. A method of providing a persistent indication of a temperature history, comprising:
  a) Providing a sensing element, comprising a shape memory alloy element having a first length at temperatures below a threshold temperature, contracting to a second length when exposed to a temperature transition from below to above the threshold temperature;
  b) Providing a constraining element, mounted with the sensing element such that when the shape memory alloy element is at the first length the constraining element prevents contraction of the shape memory alloy element to the second length;
  c) Providing a forcing element, mounted with the sensing element such that the forcing element urges the sensing element to a configuration that engages the constraining element;
  d) Then exposing the sensing element to temperatures above the threshold temperature;
  e) Then exposing the sensing element to unknown temperatures;
  f) Then determining if the sensing element exhibits the first length or the second length, with the sensing element exhibiting the first length corresponding to a temperature history including temperature below the threshold temperature, and the sensing element exhibiting the second length corresponding to a temperature history not including temperature below the threshold temperature.

* * * * *